(12) United States Patent
Dolezal et al.

(10) Patent No.: US 7,130,610 B2
(45) Date of Patent: *Oct. 31, 2006

(54) WIRELESS COMMUNICATION DEVICE FOR RECEIVING AN EMERGENCY BROADCAST MESSAGE

(75) Inventors: Anthony J. Dolezal, Barrington, IL (US); Gerald J. Gutowski, Glenview, IL (US)

(73) Assignee: Motorola Inc., Schaumburg, IL (US)

( * ) Notice: Subject to any disclaimer, the term of this patent is extended or adjusted under 35 U.S.C. 154(b) by 167 days.

This patent is subject to a terminal disclaimer.

(21) Appl. No.: 10/939,092

(22) Filed: Sep. 10, 2004

(65) Prior Publication Data

US 2006/0058005 A1   Mar. 16, 2006

(51) Int. Cl.
*H04M 11/04*   (2006.01)

(52) U.S. Cl. .............................. 455/404.1; 455/414.1; 455/414.3; 455/558

(58) Field of Classification Search ............. 455/404.1, 455/404.2, 414.2, 456.1, 503
See application file for complete search history.

(56) References Cited

U.S. PATENT DOCUMENTS

| | | | |
|---|---|---|---|
| 6,112,075 A | | 8/2000 | Weiser |
| 6,430,603 B1 | | 8/2002 | Hunter |
| 6,463,288 B1 | | 10/2002 | Havinis et al. |
| 6,571,092 B1 | * | 5/2003 | Faccin et al. ............ 455/404.1 |
| 6,745,021 B1 | | 6/2004 | Stevens |
| 2002/0012323 A1 | * | 1/2002 | Petite et al. ................ 370/252 |
| 2003/0143974 A1 | | 7/2003 | Navarro |
| 2004/0203562 A1 | * | 10/2004 | Kolsrud ................... 455/404.1 |
| 2005/0239436 A1 | * | 10/2005 | Bell et al. ................ 455/404.2 |

FOREIGN PATENT DOCUMENTS

WO   WO 2004/012470 A1   2/2004

OTHER PUBLICATIONS

D.O. 'Bud'Weiser, Applications for the Transfer of Control of Licenses and Authorizations from AT&T Wireless Services, Inc. and its Subsidiaries to Cingular Wireless Corp., Before the Federal Communications Commission, Washington, D.C. 20554, 2 pages, no date listed.
Scala—Case Studies, "Scala Software Provides Critical Information for Miami-Dade's Emergency Services", http://www.scala.com/studies/emergency.html, 2 pages, no date listed.
Scala Solutions, "Inform the community in minutes, coordinate emergency management, rally morale with better feedback", www.scala.com, 2 pages, no date listed.
"TECHNOLOGY Amber alerts to extend to e-mail, cell phones", Tuesday, Jul. 20, 2004 Posted: 3:21 PM EDT (1921 GMT), http://www.cnn.com/2004/TECH/ptech/07/20/mobile.alerts.ap/index.html, 3 pages.

(Continued)

*Primary Examiner*—Temica Beamer
(74) *Attorney, Agent, or Firm*—Joseph T. Cygan

(57) ABSTRACT

A method (200) and an apparatus (106) for a wireless communication device for receiving an emergency broadcast message are provided. The wireless communication device (106) monitors (204) incoming broadcast messages, and determines (206) whether the incoming broadcast messages include the emergency broadcast message. If the emergency broadcast message is included, then the wireless communication device (106) overrides (208) a settable broadcast service reception preference, and receives (210) the emergency broadcast message. The wireless communication device (106) then transmits (212) an acknowledgment of receiving the emergency broadcast message, and communicates (214) the reception of the emergency broadcast message.

21 Claims, 3 Drawing Sheets

OTHER PUBLICATIONS

"Solutions: Electronic Billboards & Electronic Signs", http://www.wirespring.com/Solutions/electronic_billboards_electronic_signs.html, 1 page, no date listed.

DAKTRONICS, http://www.daktronics.com/, 1 page, no date listed.

"3rd Generation Partnership Project; Technical Specification Group Services and System Aspects; Multimedia Broadcast/Multicast Service (MBMS); Architecture and functional description (Release 6)", 3GPP TR 23.846 6.1.0 (Dec. 2002) Technical Report, 114 pages, no date listed.

* cited by examiner

WIRELESS COMMUNICATION DEVICE FOR RECEIVING AN EMERGENCY BROADCAST MESSAGE

FIELD OF THE INVENTION

The present invention generally relates to a wireless communication device, and more specifically, to a wireless communication device for receiving an emergency broadcast message.

BACKGROUND OF THE INVENTION

In a wireless communication system, such as a cellular telephone system, a broadcast message, such as a short message service ("SMS") message, a cell broadcast service ("CBS") message, and a Multimedia Broadcast and Multimedia Service ("MBMS") message, can be transmitted from a base station to wireless portable communication devices that are registered to the base station. Generally, a user subscribes to a service provider for messages that provide information of his choice, such as news, sports, stock quotes, and others alike, and receives messages containing information of his choice from the service provider. However, there is no requirement to subscribe to any broadcast message service, and those wireless portable communication devices without subscription may ignore all broadcast messages. When the wireless portable communication device receives the broadcast message, the user may choose to view and/or listen to the received broadcast message now or later. However, this capability of allowing the user to delay accessing the received broadcast message can be detrimental to the user's interest in some circumstances. Further, those users without any message subscription are not even aware of the broadcast message, which may be of great interest. In emergency or time critical situations, such as a traffic accident, traffic jam, severe weather, fire, crime, terrorist attacks, bomb threats, national security alerts, or other situations alike, it would be in the user's and the public's best interest to receive and access a message regarding the emergency as soon as the message is received. For example, if a severe weather condition, such as a tornado, has just developed in the area where the user is located and a local base station transmits an emergency broadcast message notifying of the tornado in the area, it would be in the user's best interest to receive and view the message as soon as it is received. In other situations such as in a case of a missing person or kidnapping, it is desirable, or may be critical, to notify as soon as possible people in a relevant area such as a city where the missing or kidnapped person was last seen. Under emergency or time critical situations such as those described above, it is desirable to be able to receive an emergency message and to have the received emergency message communicated as soon as the emergency message is received.

DETAILED DESCRIPTION OF THE PREFERRED EMBODIMENTS

A wireless communication device monitors incoming broadcast messages for an emergency broadcast message, and receives the emergency broadcast message upon detecting the emergency broadcast message. The wireless communication device may monitor the incoming broadcast message in various modes including, but not limited to, a broadcast mode and a multicast mode of a Multimedia Broadcast and Multimedia Service ("MBMS"). Normally, a subscription is required to receive messages through the MBMS, and the wireless communication device can be configured to enable or to disable receiving messages through the MBMS. However, based upon a status of the emergency broadcast message, such configuration is overridden, and the emergency broadcast message is received upon detection by the wireless communication with or without a valid service subscription. The wireless communication device then transmits an acknowledgment of the reception, and communicates the reception of the emergency broadcast message. If the wireless communication device receives the emergency broadcast message while receiving a non-emergency broadcast message, then the wireless communication device interrupts the non-emergency broadcast message and communicates information contained in the emergency broadcast message.

Figure 1:
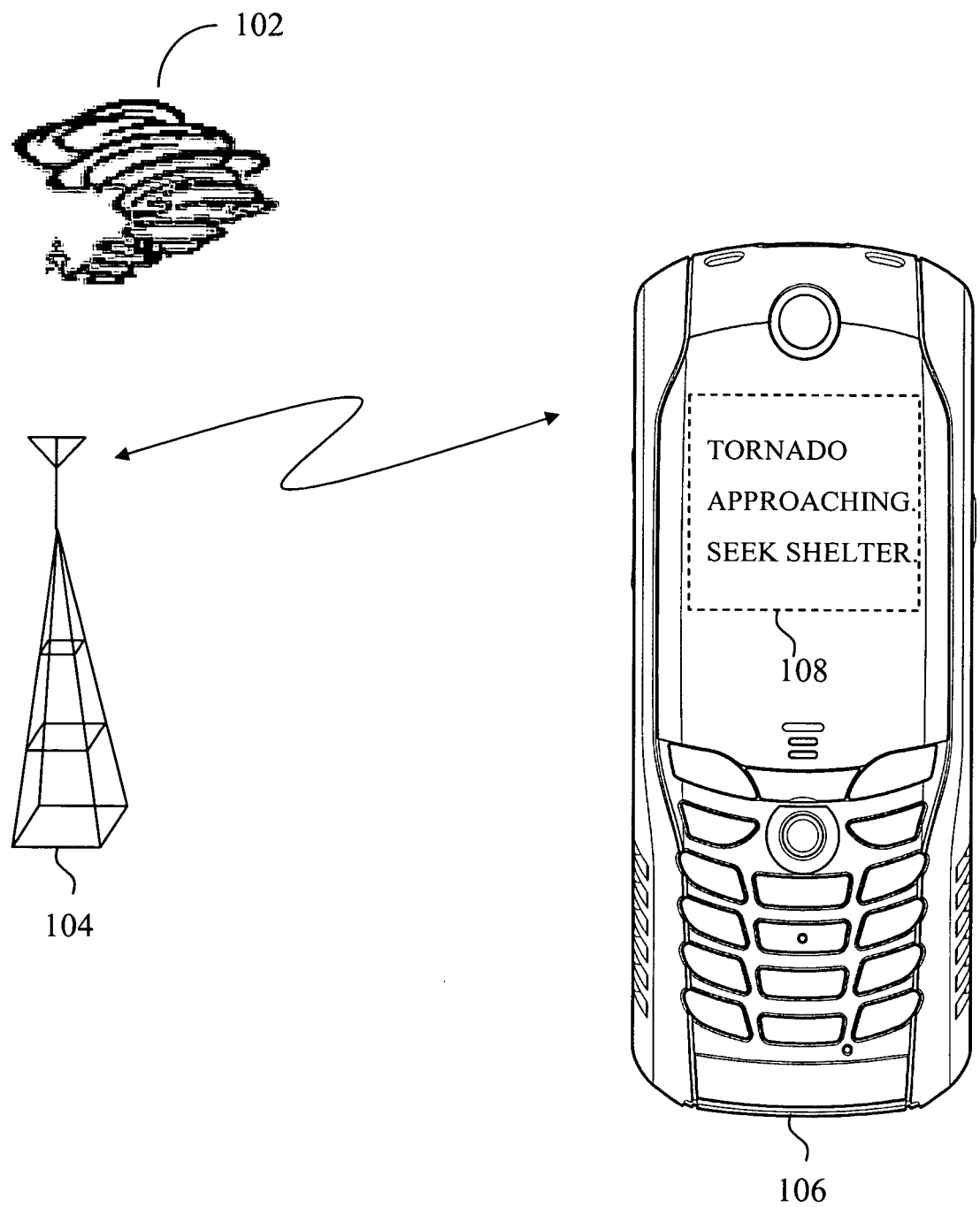
FIG. 1 is a block diagram of an environment where at least one of preferred embodiments may be practiced.

FIG. 1 is an exemplary environment 100, in which at least one of the preferred embodiments may be practiced. An emergency situation, shown as a tornado 102, is detected, and a base station 104, which has coverage over an area potentially affected by the tornado 102, broadcasts an emergency broadcast message. A wireless communication device 106 receives the emergency broadcast message, and notifies the reception of the emergency broadcast message. If the wireless communication device 106 is in use, then it conveys information 108 contained in the emergency broadcast message, which is shown as a text message indicative of the emergency situation "TORNADO APPROACHING. SEEK SHELTER." The information 108 contained in the emergency broadcast message may also take various forms based upon the nature of the emergency and the capability of the wireless communication device 106. For example, if the emergency broadcast message was an Amber alert concerning a kidnapped child, then the information 108 may include a picture of the kidnapped child and a picture of a car similar to that of the kidnapper's as well as a text describing the kidnapped child and other relevant information. In some situations, it may be desirable to deliver the information 108 in a streaming video format.

Figure 2:
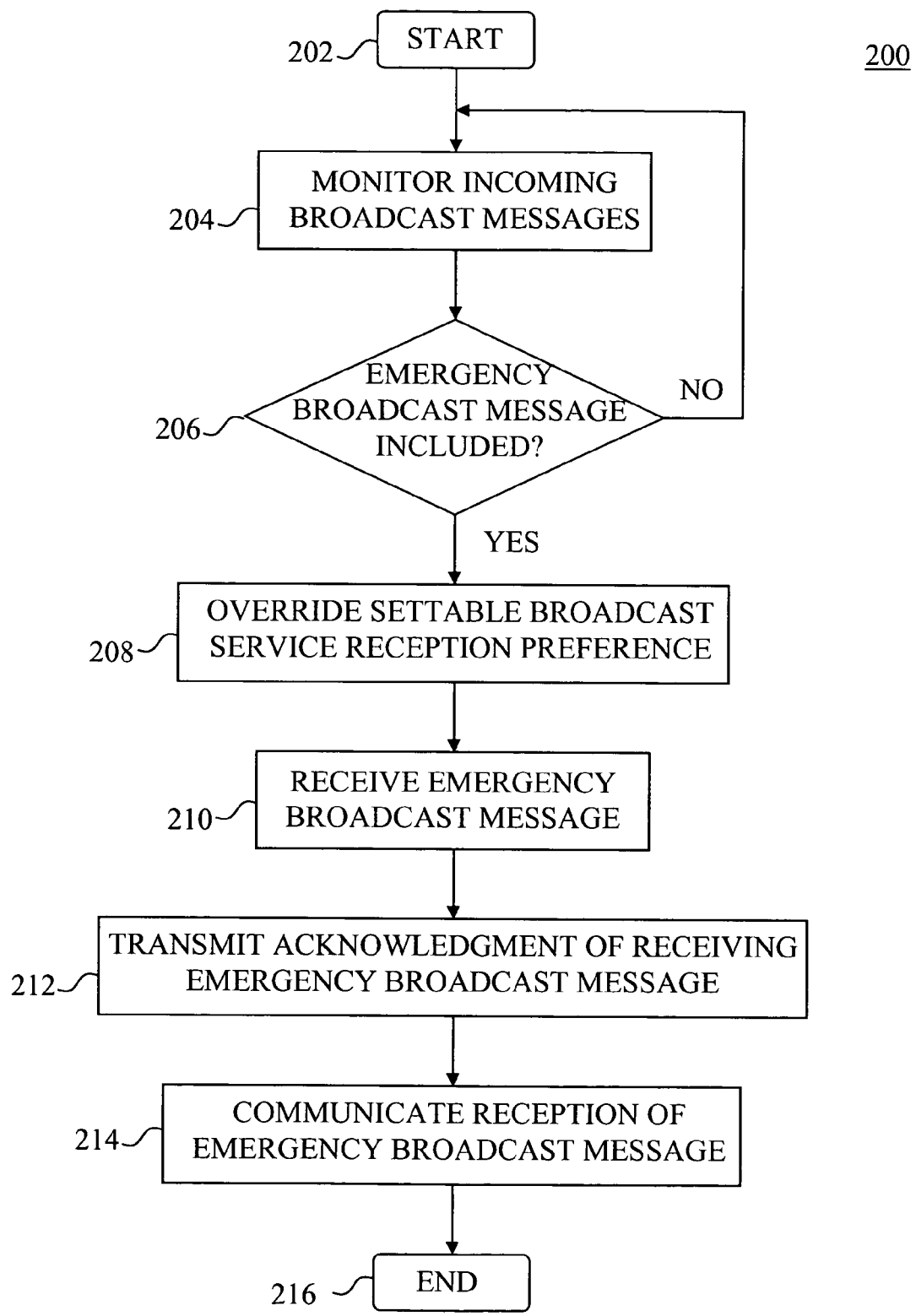
FIG. 2 is an exemplary flowchart for receiving an emergency broadcast message in accordance with at least one of the preferred embodiments.

FIG. 2 is an exemplary flowchart 200 for receiving an emergency broadcast message in accordance with at least one of the preferred embodiments. The process begins in block 202, and the wireless communication device 106 monitors incoming broadcast messages in block 204. The wireless communication device 106 may monitor the incoming broadcast messages in various modes including, but not limited to, a broadcast mode and a multicast mode of a Multimedia Broadcast and Multimedia Service ("MBMS"). In block 206, the wireless communication device 106 determines whether the incoming broadcast messages include an emergency broadcast message. The emergency broadcast message may be found by evaluating an emergency status indicator of each of the incoming broadcast messages. If no emergency broadcast message is found in block 206, then the process returns to block 204 and the wireless communication device 106 continues to monitor the incoming broadcast messages. If an emergency broadcast message is found in block 206, then the wireless communication device 106, in block 208, overrides a settable broadcast service reception preference, which can be set to receive or to refuse the incoming broadcast messages. The wireless communication device 106 may also override the need of having a valid subscription for accessing airtime if the wireless communication device 106 is operating in an emergency only mode. For example, if the wireless communication device 106 had an expired service contract, it would still be capable of placing an emergency call and would also be able to receive the emergency broadcast message. The wireless communication device 106 may further override a required presence of a user identity module such as a Subscriber Identification Module ("SIM"), a Universal Subscriber Identity Module ("USIM"), a User Identification Module ("UIM"), a Removable User Identification Module ("R-UIM"), or any other module normally required to be present. The wireless communication device 106 then receives the emergency broadcast message in block 210. The wireless communication device 106 may also receive the emergency broadcast message in various modes including, but not limited to, the broadcast mode and the multicast mode of the MBMS. In block 212, the wireless communication device 106 transmits an acknowledgment of receiving the emergency broadcast message, and communicates the reception of the emergency broadcast message in block 214. If the wireless communication device 106 is currently in use for communicating a non-emergency broadcast message, then the wireless communication device 106 may interrupt the currently communicated non-emergency broadcast message, and communicate information contained in the emergency broadcast message. The process then terminates in block 216.

Figure 3:
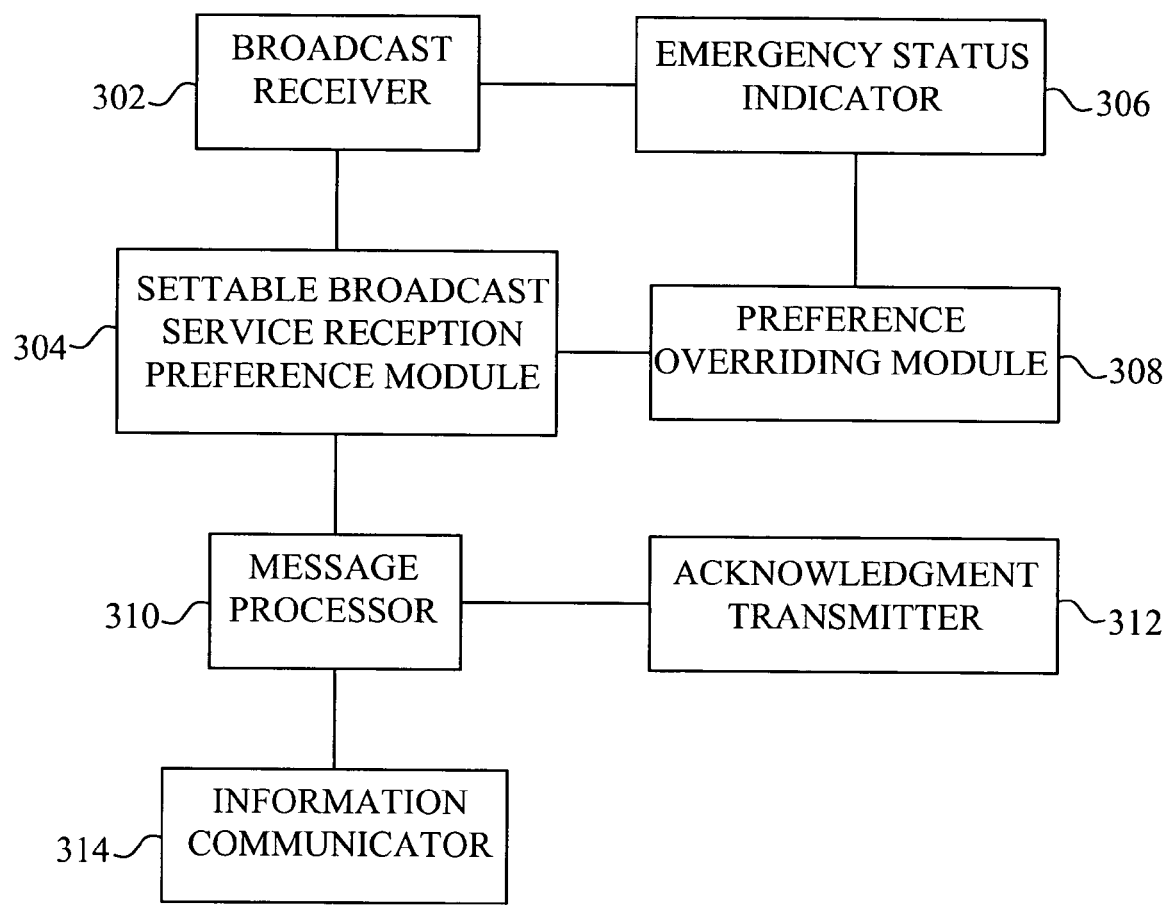
FIG. 3 is an exemplary block diagram of a wireless communication device in accordance with at least one of the preferred embodiments.

FIG. 3 is an exemplary block diagram of the wireless communication device 106 in accordance with at least one of the preferred embodiments. The wireless communication device 106 has a broadcast receiver 302, which is configured to monitor incoming broadcast messages including the incoming broadcast messages in a broadcast mode and in a multicast mode of a Multimedia Broadcast and Multimedia Service ("MBMS"). A settable broadcast service reception preference module 304 is coupled to the broadcast receiver 302, and is configured to determine whether to receive the incoming broadcast messages. The settable broadcast service reception preference module 304 can be set to receive or to refuse the incoming broadcast messages. An emergency status indicator 306, which is coupled to the broadcast receiver 302, is configured to determine whether the incoming broadcast messages include an emergency broadcast message. The emergency status indicator 306 may be further configured to evaluate an emergency status indicator of each of the incoming broadcast messages to determine whether the incoming broadcast messages include the emergency broadcast message.

A preference overriding module 308 is coupled to the settable broadcast service reception module 304 and to the emergency status indicator 306, and is configured to direct the settable broadcast service reception preference module to receive the emergency broadcast message. The preference overriding module 308 may also be configured to override the need of having a valid subscription for accessing airtime if the wireless communication device 106 is operating in an emergency only mode. For example, if the wireless communication device 106 had an expired service contract, it would still be capable of placing an emergency call and would also be able to receive the emergency broadcast message. The preference overriding module 308 may be further configured to override a required presence of a user identity module, such as a Subscriber Identification Module ("SIM"), a Universal Subscriber Identity Module ("USIM"), a User Identification Module ("UIM"), a Removable User Identification Module ("R-UIM"), or any other module normally required to be present. A message processor 310, which is coupled to the settable broadcast service reception preference module 304, is configured to process the emergency broadcast message. An acknowledgment transmitter 312 is coupled to the message processor 310, and is configured to transmit an acknowledgment of receiving the emergency broadcast message. An information communicator 314, which is also coupled to the message processor 310, is configured to convey the reception of the emergency broadcast message. The information communicator 314 may be further configured to interrupt a currently communicated message and to communicate information contained in the emergency broadcast message.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A method in a wireless communication device for receiving an emergency broadcast message, the method comprising:
   monitoring incoming broadcast messages;
   determining whether the incoming broadcast messages include the emergency broadcast message;
   overriding a settable broadcast service reception preference upon determining that the incoming broadcast messages include the emergency broadcast message;
   receiving the emergency broadcast message;
   transmitting an acknowledgment of receiving the emergency broadcast message; and
   communicating the reception of the emergency broadcast message.

2. The method of claim 1 wherein the settable broadcast service reception preference is set to one of:
   receiving the incoming broadcast messages; and
   refusing to receive the incoming broadcast messages.

3. The method of claim 2, wherein monitoring the incoming broadcast messages includes at least one of:
   monitoring the incoming broadcast messages in a broadcast mode of a Multimedia Broadcast and Multimedia Service; and
   monitoring the incoming broadcast messages in a multicast mode of a Multimedia Broadcast and Multimedia Service.

4. The method of claim 2, wherein receiving the emergency broadcast message includes at least one of:
   receiving the emergency broadcast message in a broadcast mode of a Multimedia Broadcast and Multimedia Service; and
   receiving the emergency broadcast message in a multicast mode of a Multimedia Broadcast and Multimedia Service.

5. The method of claim 2, wherein determining whether the incoming broadcast messages include the emergency broadcast message includes:
   evaluating an emergency status indicator of each of the incoming broadcast messages.

6. The method of claim 2, wherein overriding the settable broadcast service reception preference includes at least one of:
    overriding a required presence of a user identity module; and
    overriding a valid subscription requirement to access airtime.
7. The method of claim 6, wherein the user identity module is at least one of:
    a Subscriber Identification Module,
    a Universal Subscriber Identity Module,
    a User Identification Module, and
    a Removable User Identification Module.
8. The method of claim 2, wherein communicating the reception of the emergency broadcast message includes:
    interrupting a currently communicated non-emergency broadcast message; and
    communicating information contained in the emergency broadcast message.
9. A method in a wireless communication device for receiving an emergency broadcast message, the wireless communication device having a settable broadcast service reception preference determining whether to receive incoming broadcast messages, the method comprising:
    monitoring the incoming broadcast messages of a Multimedia Broadcast and Multimedia Service;
    determining whether the incoming broadcast messages include the emergency broadcast message;
    overriding the settable broadcast service reception preference and a required presence of a user identity module upon determining that the incoming broadcast messages include the emergency broadcast message;
    receiving the emergency broadcast message;
    transmitting an acknowledgment of receiving the emergency broadcast message; and
    communicating the reception of the emergency broadcast message.
10. The method of claim 9, further comprising:
    overriding a valid subscription requirement to access airtime before receiving the emergency broadcast message.
11. The method of claim 9 wherein the settable broadcast service reception preference is set to one of:
    receiving the incoming broadcast messages; and
    refusing to receive the incoming broadcast messages.
12. The method of claim 11, wherein receiving the emergency broadcast message includes at least one of:
    receiving the emergency broadcast message in a broadcast mode of the Multimedia Broadcast and Multimedia Service; and
    receiving the emergency broadcast message in a multicast mode of the Multimedia Broadcast and Multimedia Service.
13. The method of claim 11, wherein determining whether the incoming broadcast messages include the emergency broadcast message includes:
    evaluating an emergency status indicator of each of the incoming broadcast messages.
14. The method of claim 11, wherein the user identity module is at least one of:
    a Subscriber Identification Module,
    a Universal Subscriber Identity Module,
    a User Identification Module, and
    a Removable User Identification Module.
15. The method of claim 11, wherein communicating the reception of the emergency broadcast message includes:
    interrupting a currently communicated non-emergency broadcast message; and
    communicating information contained in the emergency broadcast message.
16. A wireless communication device configured to receive an emergency broadcast message, the wireless communication device comprising:
    a broadcast receiver configured to monitor incoming broadcast messages;
    a settable broadcast service reception preference module coupled to the broadcast receiver, the settable broadcast service reception preference module configured to determine whether to receive the incoming broadcast messages;
    an emergency status indicator coupled to the broadcast receiver, the emergency status indicator configured to determine whether the incoming broadcast messages include the emergency broadcast message;
    a preference overriding module coupled to the settable broadcast service reception module and to the emergency status indicator, the preference overriding module configured to direct the settable broadcast service reception preference module to receive the emergency broadcast message;
    a message processor coupled to the settable broadcast service reception preference module, the message processor configured to process the emergency broadcast message;
    an acknowledgment transmitter coupled to the message processor, the acknowledgment transmitter configured to transmit an acknowledgment of receiving the emergency broadcast message; and
    an information communicator coupled to the message processor, the information communicator configured to convey the reception of the emergency broadcast message.
17. The wireless communication device of claim 16, wherein the broadcast receiver is further configured to monitor the incoming broadcast messages in a broadcast mode and in a multicast mode of a Multimedia Broadcast and Multimedia Service.
18. The wireless communication device of claim 16, wherein the emergency status indicator is further configured to evaluate an emergency status indicator of each of the incoming broadcast messages to determine whether the incoming broadcast messages include the emergency broadcast message.
19. The wireless communication device of claim 16, wherein the preference overriding module is further configured to override at least one of:
    a required presence of a user identity module;
    a valid subscription requirement to access airtime.
20. The wireless communication device of claim 19, wherein the user identity module is at least one of:
    a Subscriber Identification Module,
    a Universal Subscriber Identity Module,
    a User Identification Module, and
    a Removable User Identification Module.
21. The wireless communication device of claim 16, wherein the information communicator is further configured to interrupt a currently communicated message and to communicate information contained in the emergency broadcast message.

* * * * *